United States Patent [19]

Nymann

[11] Patent Number: 4,480,205

[45] Date of Patent: Oct. 30, 1984

[54] AUTOMATIC BRAKE CONTROL FOR ROTARY ELECTRIC TOOLS

[76] Inventor: Svend Nymann, 68 E. Hartsdale Ave., Hartsdale, N.Y. 10530

[21] Appl. No.: 550,826

[22] Filed: Nov. 14, 1983

[51] Int. Cl.³ ............................................. H02K 7/10
[52] U.S. Cl. ...................................... 310/77; 310/48; 192/2
[58] Field of Search ................... 310/47, 48, 50, 68 R, 310/68 A, 76, 77; 188/82.7, 156; 192/1, 2, 8 R, 17 R; 173/163

[56] References Cited

U.S. PATENT DOCUMENTS

| | | | |
|---|---|---|---|
| 2,807,732 | 9/1957 | Kurtovich | 310/77 |
| 2,813,206 | 11/1957 | Jensen | 310/77 X |
| 2,839,168 | 6/1958 | Casper | 192/2 |
| 2,876,369 | 3/1959 | Doerner | 310/77 |
| 2,998,956 | 8/1959 | Zern | 310/77 |
| 4,029,159 | 6/1977 | Nymann | 192/2 X |

*Primary Examiner*—Mark O. Budd
*Attorney, Agent, or Firm*—Martin J. Spellman, Jr.

[57] ABSTRACT

An automatic brake control for rotary electric tools such as saws, drills, sanders, grinders and the like comprises a pair of spring biased brake shoes positioned about the periphery of the brake drum of an electric motor which drives the tools. The brake shoes are normally spring biased into engagement with the brake drum which is placed around the fan which in turn is pressed onto the armature shaft. Upon actuation of the motor, a cam element moves the brake shoes back from the drum and into an anchor recess at one end, permitting the motor to operate the tool. The cam element is actuated by a linkage coupled to the trigger through an intermediate pivot plate. When pressure is released on the trigger, the brake shoe springs take over snapping the shoes into contact with the drum and moving the linkage back to the starting position. This action immediately stops the tool and eliminates possible safety problems.

4 Claims, 5 Drawing Figures

AUTOMATIC BRAKE CONTROL FOR ROTARY ELECTRIC TOOLS

BACKGROUND OF THE INVENTION

This invention relates to hand operated rotary electric tools and particularly to an automatic brake control for said tools. The prior art includes a number of patents which in general disclose armature brakes for electric motors. Of particular interest is my U.S. Pat. No. 4,029,159 which discloses an electric tool wherein a solenoid mechanism is wired to the trigger switch and is activated thereby, causing a cam to move the brake shoes out of engagement with the brake drum during operation. When the trigger is released, the solenoid is deactivated, permitting the spring biased brake shoes to engage the drum, causing an immediate halt to the tool motion. The present invention is an improvement thereover in that no solenoid is necessary thereby eliminating a cost factor and as a further advantage, the mechanism is relatively simple and maintenance free.

Also of interest is U.S. Pat. No. 1,502,169 to C. B. Bennett which discloses a rotary tool having a saw type handle with a linkage connected to an electric switch for starting and stopping the motor. The patent does not disclose a cam element for expanding spring biased brakes positioned about a brake drum.

Other prior art patents in this general area include U.S. Pat. Nos. 3,096,453; 3,176,173; 3,579,066; 3,335,304 and 3,339,681. These patents are representative of the existing art in the general area of the present invention and are not intended to be an all inclusive listing of the prior art.

The present invention is an improvement over the prior art noted above in that the brake device may be readily incorporated in a wide variety of electric tools and is particularly suited for pistol-shaped electric tools which are activated by a trigger mechanism. The cam operation of spring biased brake shoes against the brake drum provides a safe immediate halt to the operation of the tool when pressure is released on the trigger. In electric drills, for example, the power may be cut off immediately when a drill breaks through the material thereby preventing the possibility of the drill getting away from the operator. Immediate stoppage is also important when operating tools such as electric saws for physical injury may result from continued rotation of the blade.

SUMMARY OF THE INVENTION

The present invention relates to an improved automatic brake control for rotary electric tools. In one embodiment the invention comprises a pair of spaced brake shoes which are mounted about the brake drum of an electric motor in the barrel of an electric hand tool. The brake shoes are normally biased by leaf springs into engagement with the brake drum on the armature shaft to maintain the motor in an "off" position. A pivot plate is mounted within the handle of the tool and is coupled by a linkage to an elongated member having a cam portion at the end thereof which actuates the brake shoes driving them away from the brake drum and into an anchor recess at the opposite ends thereof while power is simultaneously applied to the motor. When pressure is released on the trigger, the pressure of the springs on the brake shoes brings the shoes out of the anchor recess and into engagement with the drum thereby immediately halting the tool. While the invention is particularly suited for use in hand tools, it is also adaptable for use in larger tools and machinery.

Accordingly an object of this invention is to provide a new and improved brake control device for rotary tools.

Another object of this invention is to provide a new and improved brake control device for hand operated electric rotary tools by reliable mechanical means.

A further object of this invention is to provide an automatic brake for rotary electric tools whereby a pair of spring loaded brake shoes are immediately snapped into position with a brake drum mounted on the armature shaft when pressure is released on the trigger.

A more specific object of this invention is to provide a new and improved brake control device wherein a pivot plate is mounted in the handle of a rotary electric tool and is coupled via a linkage to a linkage member having a cam portion at the end thereof to cam break shoes out of engagement with a brake drum upon exertion of pressure on the trigger and to cause an immediate stopping of the tool when the trigger is released.

BRIEF DESCRIPTION OF THE DRAWINGS

Other objects and advantages of the present invention may be seen from the following description when viewed in conjunction with the accompanying drawings wherein.

DETAILED DESCRIPTION OF THE INVENTION

Figure 4:
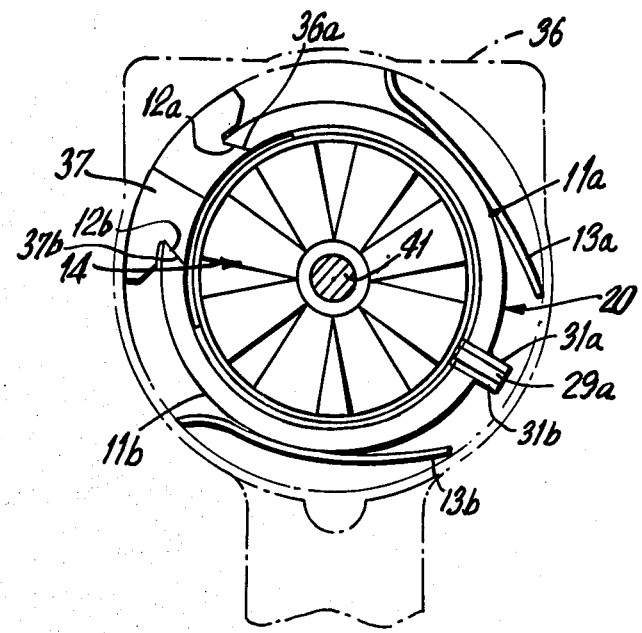
FIG. 4 is a schematic illustration of the brake elements in an "on" position in a view taken along the lines 4—4 of FIG. 1.

Referring now to the drawings, the brake control device of the present invention comprises means for immediately halting a rotary tool 10 when power is cut off to the tool. The device included a pair of curved brake shoes 11a and 11b best seen in FIGS. 4 and 5, which has striker plates 31a and 31b at one end and a sloping face 12a and 12b at the other end. The sloping faces 12a and 12b slidably engage mating recesses 36a and 35b in the anchor plate 37 which is fastened to the tool housing. The brake shoes 11a and 11b are normally biased by corresponding leaf springs 13a and 13b into engagement with the brake drum 20 which is placed about the fan 14 which in turn is mounted on the armature shaft 41. The motor 15 is wired to the switch 16 for activation when the trigger 17 is pressed backwardly as shown in FIG. 2.

Figure 1:
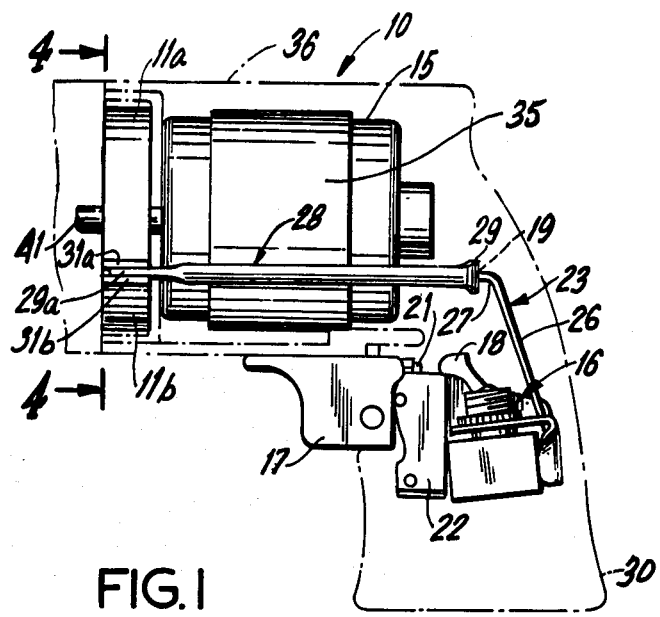
FIG. 1 is a schematic cut-away drawing of the invention showing the brake elements in the "on" position, the tool itself being "off".
Figure 2:
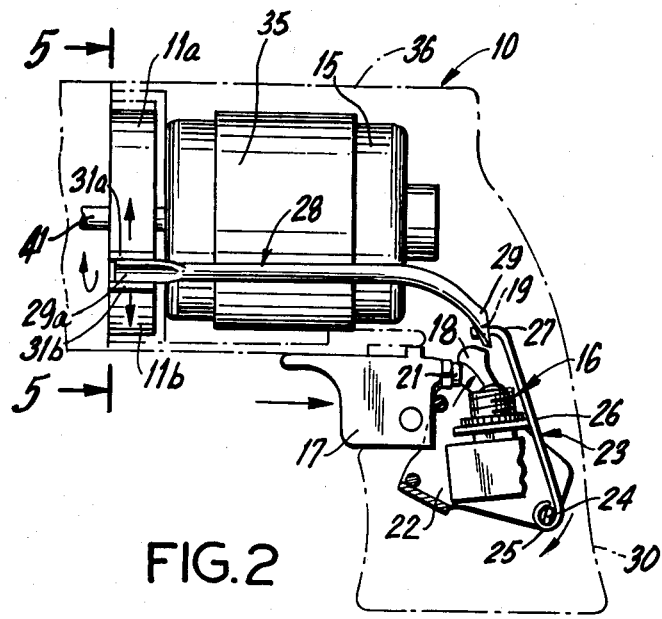
FIG. 2 is a schematic illustration of the brakes elements in the "off" position.
Figure 3:
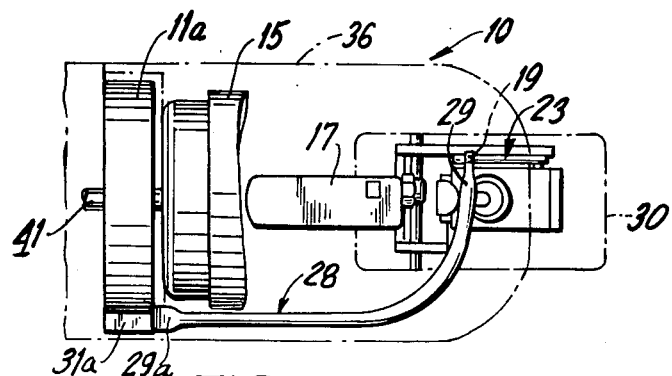
FIG. 3 is a cut-away illustration of the invention from a top view particularly showing the linkage elements thereof.

The arrangement of FIG. 1 shows the tool 10 in an "off" position whereas FIG. 2 shows the trigger 17 being squeezed backwardly engaging the upward portion 18 of switch 16 with a rearwardly protruding portion 21 of said trigger 17. When the switch 16 is engaged by portion 21, the motor 15 is activated causing rotation of the armature shaft 41 at the same time the brake shoes 11a and 11b have been released. The point of the invention is to release the brake shoes 11a and 11b simultaneously with the operation of motor 15 and, on the other hand, immediately drive the brake shoes 11a and 11b into engagement with the drum 20 when the trigger 17 is released. Thus, the rotary tool does not continue to run after power is cut off.

In FIG. 1, the trigger 17 is shown as reciprocal within the handle 30 and engaging a pivot plate 22 which is moved rearwardly when the trigger 17 is squeezed. The plate 22 includes a linkage member 23 mounted about a post 24 at a rear portion thereof. The linkage 23 includes an end portion 25 wrapped about said post 24 and an elongated main body portion 26 terminating at the other end in a curved portion 27. The portion 27 engages an aperture 19 in a second elongated member 28 having a downwardly extending portion 29 at one end engaging said linkage portion 27 and a cam portion 29a at the opposite end thereof. The member 28 extends generally along the barrel 36 of the tool 10 on one side of the motor 15.

Figure 5:
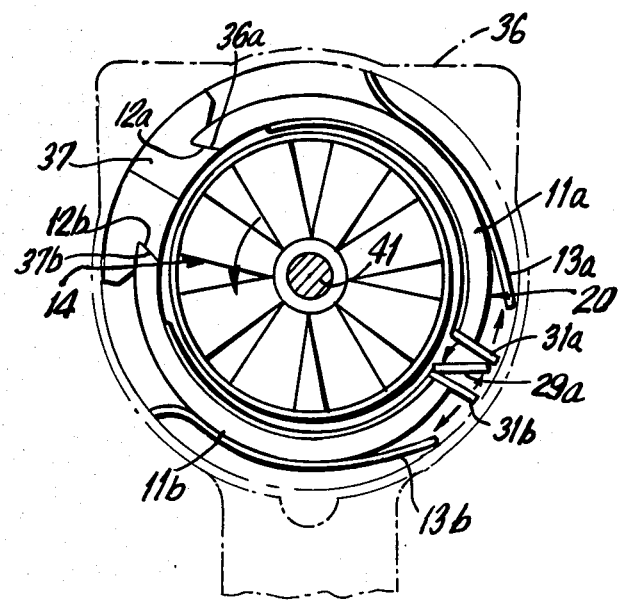
FIG. 5 is a view taken along the lines of 5—5 of FIG. 2.

The cam portion 29a of linkage 28 is positioned in an opening between the projecting portions or striker plate ends 31a and 31b of the brake shoes 11a and 11b with the armature 35 being coupled to said brake drum 34. The cam portion 29 which is substantially rectangular rotates as shown in FIG. 5 to cam 31a and 31b out of engagement with the brake drum 20 during operation. The chisel-shaped opposite end 12a and 12b of the brake shoes 11a and 11b slides into corresponding notches 36a and 36b releasing the brake drum 20. On the other hand, the cam portions 29 rotate under pressure of the leaf springs 13a and 13b when the trigger 17 is released causing an abrupt halt to the rotary motion of the tool as the shoes 11a and 11b slide outwardly from the anchor plate 37. This action eliminates safety problems caused by continuous running of the tool even after pressure has been released on the trigger 17 and the motor 15 has been deactivated.

The brake control comprising this invention may be used in any number of rotary hand tools such as saws, drills, etc., and is not limited to pistol grip tools. The device is simple, inexpensive and reliable and consequently should find wide application in hand tools.

It is understood that the above-described arrangements are merely illustrative examples of the application. Numerous other arrangements may be readily devised by those skilled in the art which will embody the principles of the invention and fall within the spirit and scope thereof.

I claim:

1. In a rotary electric tool having a motor with a rotating armature, a fan, and a brake drum mounted on the fan within a housing, an automatic brake control device comprising:

a pair of curved brake shoes slidably mounted at one end about the brake drum and each brake shoe having a projecting portion at one end extending outwardly from the brake drum and in a substantially parallel spaced relation forming a striker plate and a sloping face at the other end, an anchor plate mounted to the housing and having a recess at each end which is slidably engaged by the sloping face of a corresponding brake shoe, spring means normally biasing the brake shoes into engagement with the brake drum, an elongated linkage element having a cam portion mounted between the projecting portions of the striker plate of the brake shoes at one end and a curved portion having a coupling aperture at the other end, a reciprocable trigger mounted for movement in the housing of said tool, means for activating the motor comprising switch means activated by the trigger, and, linkage means mounted within the housing and connected to the trigger to simultaneously actuate the enlongated linkage element camming the brake shoes outwardly against the bias of the spring means thereby releasing the brake drum and associated fan upon operation and wherein the armature is immediately halted when the trigger is released as the spring means drive the brake shoes into engagement with the brake drum.

2. In a rotary tool in accordance with claim 1 wherein:

the linkage means comprising a pivot plate mounted for rotational movement within the tool housing having an outwardly protruding post and a linkage element having an elongated body portion, a curved end portion mounted about the post and another end portion formed at an angle to the body portion for coupling to the aperture of the first linkage element.

3. In a rotary tool in accordance with claim 2 wherein:

the first linkage element having a cam portion at one end includes an aperture extending through the curved portion at the other end, said aperture being engaged by the angularly positioned portion of the second linkage elemnt which is coupled to the post on the pivot plate.

4. A rotary tool in accordance with claim 2 wherein:

the tool comprises a pistol-type tool having a handle and a barrel with the motor mounted therein and said elongated linkage extends axially therealong, and wherein the trigger is reciprocable within the handle and is coupled to the linkage means therein.

* * * * *